United States Patent [19]

Carpenter

[11] Patent Number: 4,742,257
[45] Date of Patent: May 3, 1988

[54] TOTALLY ENCLOSED FAN COOLED INDUCTION MOTOR WITH IMPROVED COOLING

[75] Inventor: Keith H. Carpenter, Kettering, Ohio

[73] Assignee: General Motors Corporation, Detroit, Mich.

[21] Appl. No.: 8,233

[22] Filed: Jan. 29, 1987

[51] Int. Cl.$^4$ .............................................. H02K 9/00
[52] U.S. Cl. ........................................ 310/62; 310/57; 310/58; 310/63; 310/64
[58] Field of Search .................. 310/88, 62, 63, 58, 310/59, 60 R, 64, 65, 52, 53, 89, 90, 51, 260

[56] References Cited

U.S. PATENT DOCUMENTS

| | | | |
|---|---|---|---|
| 1,345,638 | 7/1920 | Schmidt . | |
| 1,383,883 | 7/1921 | Truitt et al. . | |
| 1,479,636 | 9/1924 | Wiard . | |
| 1,487,766 | 11/1924 | Sutcliffe . | |
| 1,852,476 | 4/1932 | Pfleger | 310/57 |
| 2,079,143 | 1/1935 | Albertson | 172/36 |
| 2,488,409 | 11/1946 | Hubscher | 172/36 |
| 2,809,307 | 4/1955 | Muczenski et al. | 310/60 |
| 3,062,976 | 11/1960 | Wiley | 310/60 |
| 3,383,529 | 5/1968 | Baumann | 310/52 |
| 3,518,468 | 11/1968 | Wightman | 310/63 |
| 3,531,668 | 2/1969 | Cathey | 310/58 |
| 3,610,975 | 10/1971 | Onjanow | 310/63 |
| 3,749,949 | 7/1973 | Muller | 310/59 |
| 3,761,748 | 9/1973 | Baumann et al. | 310/58 |
| 4,009,405 | 2/1977 | Gleichman | 310/58 |
| 4,609,840 | 9/1986 | Eats et al. | 310/58 |

FOREIGN PATENT DOCUMENTS

| | | | |
|---|---|---|---|
| 2951858 | 7/1981 | Fed. Rep. of Germany | 310/58 |
| 1049666 | 12/1953 | France | 310/88 |

*Primary Examiner*—R. Skudy
*Attorney, Agent, or Firm*—Robert M. Sigler

[57] ABSTRACT

An induction motor comprises a stator and rotor totally enclosed in a case with no air communication through the case, an internal shaft mounted fan at each end of the rotor and an external fan and fan shield at one end to direct cooling air along the outer surface of the case. The motor is further provided with hollow, toroidal baffles internally at each end which force the air within the case at each end of the motor to be circulated across the bearing and ends of the windings to pick up heat and along the internal surface of the case to exchange the heat through the case with the fan driven outside air. A further improvement is the provision of an air channel from the fan shield along the outer surface of the case to the other end of the motor and radial ducts from the channel to the interior of the baffle and from the opposite side of the baffle to the case, whereby a portion of the fan driven external cooling air is forced through the interior of the driving end baffle. Another improvement is the provision of a lower axially extending inlet duct and an upper radially extending outlet duct for the fan end baffle for air to be driven therethrough by the external fan.

4 Claims, 1 Drawing Sheet

TOTALLY ENCLOSED FAN COOLED INDUCTION MOTOR WITH IMPROVED COOLING

BACKGROUND OF THE INVENTION

This invention relates to totally enclosed, fan cooled induction motors. Such motors include stator and rotor totally enclosed to prevent damage from harmful substances in the operating environment and include a motor driven outer fan mounted on the rotor shaft projecting from the motor case at the non-drive end within a fan shield to direct cooling air over the outer surface of the case.

Within such motors, an internal fan is formed at each axial end of the rotor to encourage air circulation within the case with consequent heat transfer from the enclosed motor components to the inner surface of the case for heat transfer through the case to the cooling air outside. The most critical components to cool are the insulation of the stator windings and the bearings of the rotor shaft. The most difficult cooling is at the driven end of the motor, since it is farthest from the outer fan and the bearing at this end has a greater load.

Cooling problems of such motors in the past have been solved by such means as enlarging the case for more cooling surface area, rating the motors for a lower power rating for a given fan RPM and using a special and more expensive insulation with a higher temperature tolerance on the stator windings. However, the field has become extremely mature and competitive, so that there is a great benefit in seemingly slight improvements in cost or efficiency; and the aforementioned solutions sacrifice one or the other. It has become desirable to minimize the size and weight of the motor cases, use less expensive stator winding insulation and maximize the efficiency and power ratings of the motors.

SUMMARY OF THE INVENTION

The invention may be summarized as an induction motor of the type described above which has added, inside the case near each axial end thereof, a hollow toroidal baffle suspended to create an internal air flow circulation path wherein internal air is driven by the internal fan means radially outward to the circumferential portion of the case across the ends of the stator windings to pick up heat therefrom, axially and radially inwardly along the inner surfaces of the circumferential portion and axial end, respectively, of the case for cooling heat exchange through the case to the outside fan driven air, over the bearing to pick up heat therefrom and axially back to the internal fan means.

In an additional improvement, the motor further comprises an enclosed air channel extending from the fan shield along the outer surface of the case, a first air duct extending radially inward through the case from the air channel to the hollow toroidal baffle at the axial end of the motor opposite the external fan and a second air duct extending radially outward through the case from the toroidal baffle radially opposite the first air duct, whereby cooling air is channeled from the fan at one end of the motor along the outer surface of the case and through the baffle at the other end for internal heat exchange with the air circulated by the internal fan means.

Thus the internal air is forced into circulation across the most temperature critical parts of the motor—the bearings and stator winding insulation—and against the inner surface of the case for heat exchange therewith. In addition, with the additional channel and ducts, external air is forced through the baffle at the hotter end of the motor opposite the external fan for internal heat exchange. Further details and advantages of the invention will be apparent from the accompanying drawings and following description of a preferred embodiment.

DESCRIPTION OF A PREFERRED EMBODIMENT

Figure 1:
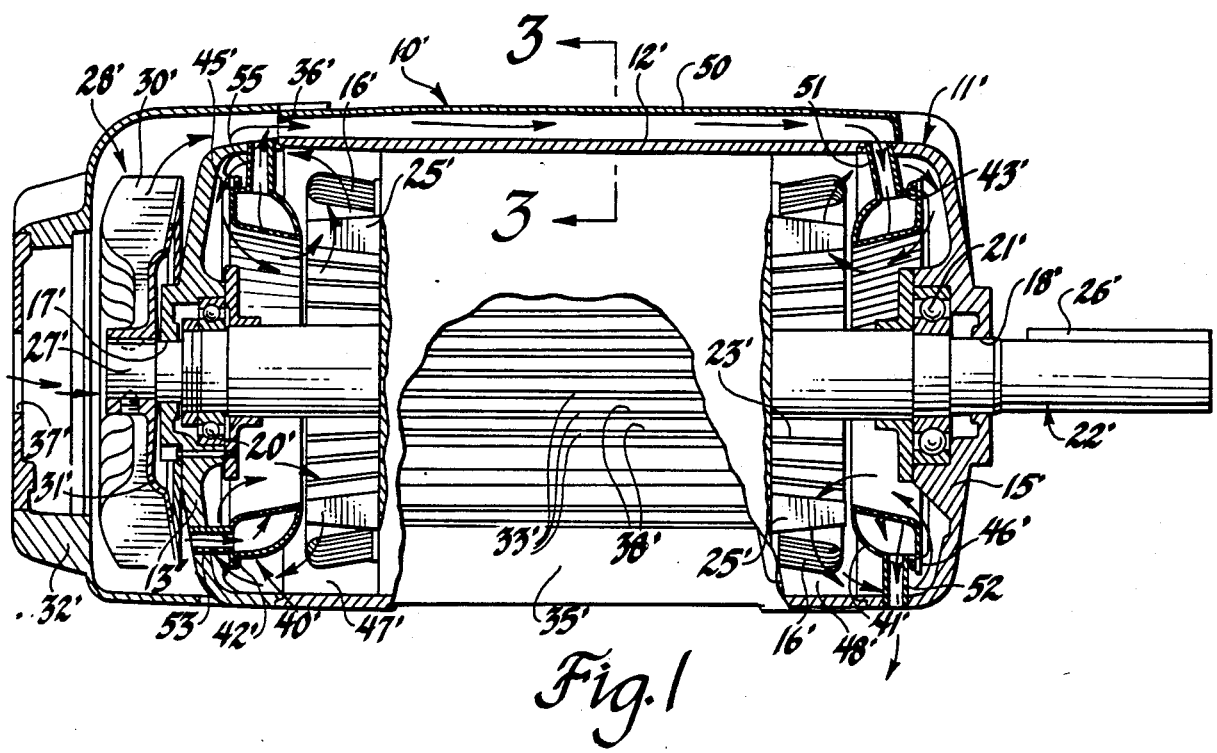
FIG. 1 is a partial section through a first embodiment of the motor of this invention.
Figure 2:
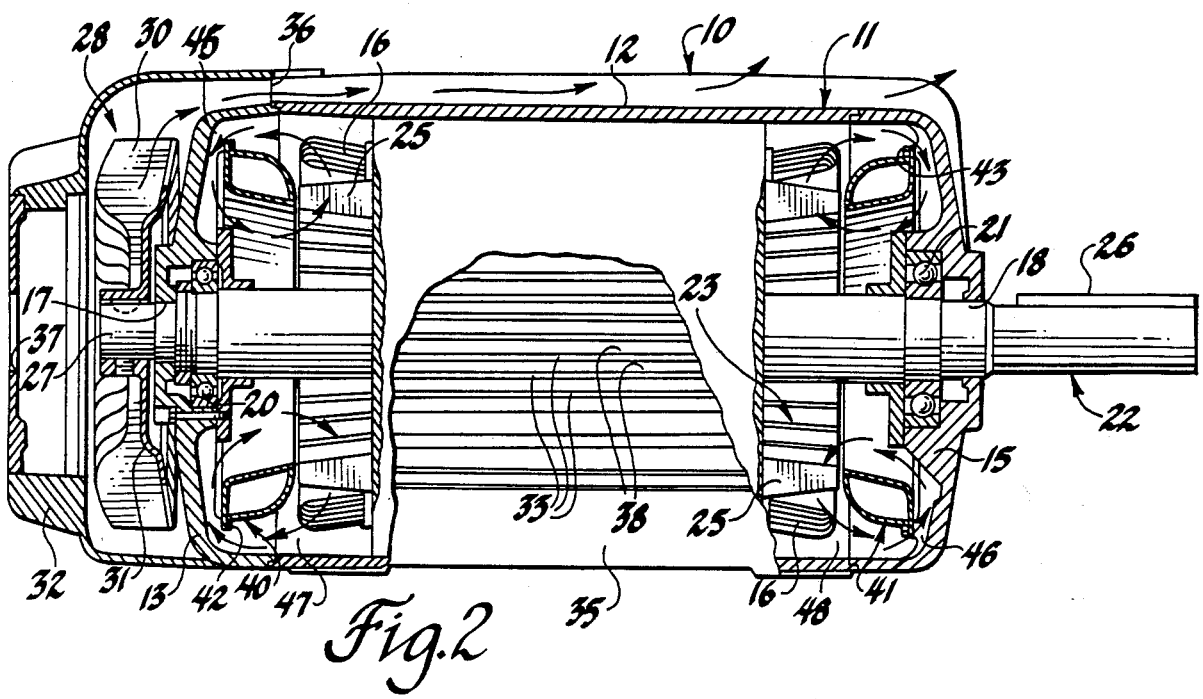
FIG. 2 is a partial section through a second embodiment of the motor of this invention.

Referring to FIG. 2, an induction motor 10 has a generally cylindrical case 11 comprising a circumferential portion 12 and axial end portions 13 and 15. Case 11 totally encloses a stator including windings 16, which stator is attached to the circumferential portion 12 of case 11. The axial end portions 13 and 15 of case 11 have central openings 17 and 18, respectively and support bearing assemblies 20 and 21, respectively. Rotatably supported in bearing assemblies 20 and 21 is the shaft 22 of a rotor 23, which rotor has integral fan blades 25 at each axial end thereof. A driving end 26 of shaft 22 is keyed to provide rotating drive engagement with a driven load; and the opposite end 27 of shaft 22 supports an external fan 28 comprising a plurality of radially extending, axially aligned blades 30 and a backing plate 31 at the motor end of the blades. In the prior art, backing plate 30 extends radially outward substantially the full length of blades 30 for noise reduction; however, in this invention, an outer annular portion of backing plate 31 is removed. This allows more air circulation axial end 13 of case 11; and it has a further beneficial effect with the embodiment of FIG. 1 which will be discussed in connection with the description of that embodiment.

External fan 28 is enclosed in a fan shield 32 attached to axial end 13 of case 11. Circumferential portion 12 of case 11 has a plurality of axially extending cooling fins 33, which substantially cover it, except for the solid base member 35 at the bottom thereof. Fan shield 32 is attached to the ends of the cooling fins so that there is a circumferential opening 36 defined at the motor end of fan shield 32. In addition, there is a central opening 37 at the opposite axial end of fan shield 32, so that rotation of fan 28 within fan shield 32 causes air to be drawn in through central opening 37 and blown over axial end 13 of case 11 and out through circumferential opening 36 in an axial direction back along the outer surface of case 11 in the passages 38 defined between cooling fins 33.

Once free of the confines of fan shield 32, a portion of the blown air escapes, but some, held to the case surface by the Coanda effect, continues along the full length of the circumferential portion 12 of case 11 to the opposite axial end 15 thereof. The volume and velocity of air reaching axial end 15 is considerably reduced; and its temperature is increased as a result of heat exchange with the portions of case 11 over which it has passed. Therefore, cooling of axial end 15 of case 11 is not as efficient as cooling of axial end 13 thereof. In addition, axial end 15 being at the driving end of shaft 22, there is a greater load on bearing assembly 21 with a resulting greater amount of heat generated therein than in bearing assembly 20 at the fan end of motor 10. Bearing assembly 21 therefore tends to run hotter than bearing assembly 20 in motor operation.

In addition to bearing assemblies 20 and 21, windings 16 are the other critical component of motor 10 with regard to cooling. Heat is generated in windings 16 with current flow therethrough; and the insulation of the windings is one of the least temperature tolerant materials in the motor. This is especially true at the axial ends of windings 16, which are visible in FIG. 1, since there is no direct contact with the core, which might act as a heat sink. There are different grades of insulation, with corresponding different temperature tolerances. It is most desirable to use class B insulation, which allows an 80 degree (C) temperature rise. Higher grades F and H allow higher temperature rises, but are also more expensive. Grade H, in addition, is much more difficult to use in motor manufacture.

Case 11, as already mentioned, totally encloses the stator and rotor of motor 10. The phrase "totally enclosed" means, in this application, that there is no communication of air through the case, and thus no possibility of bringing cooling air from outside the case into the interior. Such motors are intended for use in hostile environments, where the outside air may include contaminants or corrosive substances which are harmful to motor operation if introduced to the interior thereof. In such motors, therefore, the case serves as a heat exchanger between the hot interior and cooler exterior. The prior art means for increasing the flow of cooling air over the exterior of the case has been discussed above. The prior art method for increasing the interior heat conduction to the case is the inclusion of internal fan blades 25, which rotate with the rotor and shaft 22 and create air movement within the interior at each axial end of case 11. Unfortunately, the air movement created is chaotic and inefficient, with a large portion of the air moving circularly in turbulence and eddies near the blades and thus contributing little to heat transfer from the windings 16 and bearing assemblies 20 and 21 to case 11.

A method of increasing cooling in motors of the type shown in FIG. 1 which is commonly used is to put the motor in a larger diameter and/or longer case. This increases the cooling surface area, but creates heavier and more expensive motors. For example, a motor which fails to qualify, due to temperature rise, with class B insulation at 350 HP with an exterior fan speed of 1200 RPM in a 5-07 frame may do so in a 5-09 or 5-11 frame. These numbers show an increase in axial length of the case with the same diameter. Since the stator windings and rotor do not increase in length, this creates larger interior spaces at the axial ends of the motor.

Returning to the description of this invention in FIG. 2, the difference between the motor of this invention and the prior art will be described. At each axial end of the motor interior, within case 11, is a hollow toroidal baffle, with baffle 40 adjacent axial end 13 and baffle 41 adjacent axial end 15. In this embodiment, baffles 40 and 41 are essentially identical. They may be attached with flange portions 42 and 43, respectively, to mounting bosses 45 and 46 of axial ends 13 and 15, respectively; and they are suspended thereby away from other contact with case 11 or any interior components of motor 10 to form circular air circulation passages 47 and 48, respectively. Since the baffles take up a major portion of the center of the interior volume at each axial end of the motor, they allow less space for air to stagnate in turbulence at the center of the space; and they thus assist the internal fan blades 25 in circulating the air over the ends of windings 16 and bearing assemblies 20 and 21 to case 11, as indicated by the arrows in FIG. 2.

To be more specific, internal air is driven by internal fan blades 25 radially outward across the ends of stator windings 16 to the circumferential portion 12 of case 11, picking up heat therefrom, axially along the inner surface of circumferential portion 12 of case 11, and radially inwardly along the inner surface of the axial end 13 or 15 of case 11 for cooling heat exchange through case 11 to the outside fan driven air. The baffles force the air to flow along the interior surface of case 11 for the maximum possible distance. The air returns axially along shaft 22 to fan blades 25, having passed the bearing assembly 20 or 21 and picked up heat therefrom. The axial ends 13 and 15 of the case tend to be the coolest portions thereof, since they are the farthest portions from the major heat producing stator windings and, in the case of axial end 13, are directly cooled by the external air blown by fan 28. Thus, the internal air, after picking up significant heat from the windings, is passed over these relatively cool surfaces to lose this heat before passing over the bearing assemblies 20 and 21, whereby the interior air is more efficiently directed to transfer heat from the bearing assemblies and ends of the windings to the interior surface of the case.

In some cases, however, the improvement produced by the embodiment of FIG. 2 may not be sufficient. It has already been mentioned that cooling of prior art motors is more efficient at the fan end than at the driving end of the motor. Although the embodiment of FIG. 2 improves the cooling efficiency of the motor, most of the improvement takes place at the fan end, since the basic cooling method of heat exchange through the case 11 is the same; and the factors leading to less cooling efficiency at the driving end of the motor are inherent in that cooling strategy.

Figure 3:
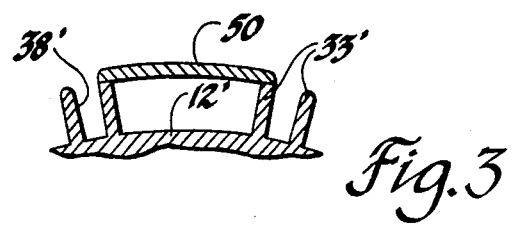
FIG. 3 is a section view along lines 3—3 of FIG. 1.

The embodiment of FIGS. 1 and 3 shows an improvement in cooling efficiency over that of FIG. 2, especially at the driving end of the motor. Most of the motor components are identical and are assigned identical but primed reference numerals. The different parts are assigned new reference numerals. The difference between the embodiments involves the creation of an air passage from the external fan to the driving end of the motor and through the interior of baffle 41' and/or another through baffle 40' for internal heat exchange to increase the cooling efficiency at one or both ends of the motor.

Referring to FIG. 1, a cover 50 is formed over the fins at the top of motor 10' which extends from the fan shield at the fan end of motor 10' to the opposite axial end 15'. The cover spans the distance across the air passages 38' between one or more of the fins 33' and may comprise a formed sheet metal plate. If it spans more than one such passage 38', the interior fins 33' separating the spanned passages may be removed, or not formed in the first place, as seen in FIG. 3, to decrease the resistance to air flow. Cover 50 and the outermost spanned fins thus form a passage for the conduction of air from fan 28' to the driving end of motor 10'. Baffle 41' is modified by the addition of an inlet air duct 51 extending radially inward, downward in FIG. 1, from circumferential portion 12' of case 11' to baffle 41' and communicating the passage described above from fan 28' to the interior of baffle 41'. In addition, an outlet air duct 52 extends radially outward, downward in FIG. 1, from baffle 41' to case 11' to provide an exit for air circulating through the baffle. Of course, there is no communication between the interior of baffle 41' or ducts 51 and 52 and the other internal motor components; the motor is still totally enclosed.

The ducts could be a series of parallel tubes or an elongated single tube for reduced air flow resistance. Also in the interest of reduced air flow resistance, the number of bends or corners is minimized; and air flow is maintained as straight as possible. Even with the greatest attention to decreasing the air resistance of the air flow through the passages, however, the resistance will still be considerable. Therefore, it may be desirable in some cases to block off some of the periphery around the opening between fan shield 32' and axial end 13' that does not form part of the passage in order to increase pressure and therefore air flow through the passage to the other end of the motor. This would particularly be the case where the fan end of the motor met temperature specifications easily but the driving end did not.

In addition, still referring to FIG. 1, one or more axially directed inlet ducts 53 extend between the axial end 13' of case 11' and baffle 40' near the bottom thereof to open the interior of baffle 40' to air driven by fan 28' against axial end 13'. The other reason for the removal of the radially outer portion of backing plate 31', mentioned previously, is to allow fan 28' to pump cooling air into the interior of baffle 40' through duct(s) 53. This is accomplished by having backing plate 30' on the motor side of external fan 28' stop, in its outward radial extension from the center, short of inlet air duct 53, as seen in FIG. 1. An outlet duct 55 extends radially outward, upward in FIG. 1, between baffle 40' and circumferential portion 12' of case 11' so that cooling air so pumped into baffle 40' may flow upward therethrough and exit to the atmosphere again. The pumping action of fan 28' is assisted in creating this flow by the tendency of the air in baffle 40' to rise as it is warmed.

It should be clear that ducts 53 and 55 for baffle 40' may be considered independently of ducts 51 and 52 for baffle 41'. Either end may include the ducts or not. It is most probable that the ducts would be needed, if at all, at the driving end of the motor, since it is the farthest from the external fan 28'. However, the inclusion of ducts 53 and 55 at the fan end of motor 10' may produce some slight improvement in cooling even at the other end, since more heat is being removed from the windings and the external cooling air reaching the driving end may be cooler and thus somewhat more efficient in heat exchange.

The embodiments of the invention in which an exclusive property or privilege is claimed are defined as follows:

1. An induction motor comprising a generally cylindrical case having a circumferential portion and a pair of axial ends, a stator with insulation covered windings in the case and a rotor on a shaft rotatable in bearings in the case, the case totally enclosing the stator and rotor with no air communication therethrough, the rotor comprising internal fan means on each axial end thereof, the motor further comprising an external fan mounted on and driven by the shaft projecting from one end of the case and a fan shield surrounding the external fan and directing cooling air driven by the external fan axially over the surface of the case, the motor further comprising, adjacent each axial end of the case:

a hollow toroidal baffle suspended axially between the internal fan means of the rotor and the axial end of the case and radially between the shaft and the circumferential portion of the case, each baffle thereby creating an internal air flow circulation path wherein internal air is driven by the internal fan means radially outward across the ends of the stator windings to the circumferential portion of the case to pick up heat from from the stator windings, axially along the inner surface of the circumferential portion of the case and radially inwardly along the inner surface of the axial end of the case for cooling heat exchange through the case to the cooling air driven by the external fan, over the bearing to pick up heat therefrom and axially back to the internal fan means;

an enclosed air channel extending from the fan shield along the outer surface of the case;

an inlet air duct extending radially inward through the case from the air channel to the hollow toroidal baffle at the axial end of the motor opposite the external fan; and an outlet air duct extending radially outward through the case from the hollow toroidal baffle diametrically opposite the inlet air duct, whereby cooling air is channeled from the fan at one end of the motor along the outer surface of the case and through the hollow toroidal baffle at the other end for internal heat exchange with the air circulated by the internal fan means.

2. The motor of claim 1 further comprising axially extending fins on the outer surface of the case for additional heat exchange area with external air, the fins defining passages therebetween, the motor of claim 2 further comprising a cover over one or more of the axially extending fins from the end adjacent the fan shield to the other end adjacent the inlet air duct, the cover and fins comprising the enclosed air channel.

3. The motor of claim 1 further comprising:

an inlet air duct extending axially from the axial end of the case to a lower portion of the hollow toroidal baffle at the axial end of the motor adjacent the external fan, whereby external air is pumped into the baffle by the external fan; and an outlet air duct extending radially upward through the case from an upper portion of the toroidal baffle diametrically opposite the inlet air duct, whereby the external air flows through the baffle for internal heat exchange with the air circulated by the internal fan means.

4. The motor of claim 3 in which the external fan comprises a plurality of radially extending, axially oriented blades and a backing plate for noise reduction, the backing plate extending from the center of the fan outward on the motor side of the blades but stopping radially short of the inlet air duct, whereby the external fan more efficiently pumps air into the inlet air duct.

* * * * *